(12) United States Patent
Bhaskaran et al.

(10) Patent No.: US 7,050,656 B2
(45) Date of Patent: May 23, 2006

(54) IMAGE SCALING IN THE COMPRESSED DOMAIN

(75) Inventors: Vasudev Bhaskaran, Sunnyvale, CA (US); Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 10/316,362

(22) Filed: Dec. 11, 2002

(65) Prior Publication Data

US 2004/0114812 A1 Jun. 17, 2004

(51) Int. Cl.
*G06K 9/32* (2006.01)
(52) U.S. Cl. .................. 382/298; 382/232; 382/240; 382/250; 382/251
(58) Field of Classification Search ............ 382/298, 382/248, 232, 233, 240, 250, 246, 251; 345/660, 345/667; 375/240.11
See application file for complete search history.

(56) References Cited

U.S. PATENT DOCUMENTS

| 5,708,732 A | * | 1/1998 | Merhav et al. ............ 382/232 |
| 5,845,015 A | | 12/1998 | Martucci ................. 382/250 |
| 6,067,384 A | | 5/2000 | Manickam et al. ......... 382/250 |
| 6,141,456 A | | 10/2000 | Pearlstein et al. .......... 382/250 |
| 6,144,772 A | | 11/2000 | Garland et al. ............ 382/239 |
| 6,222,944 B1 | | 4/2001 | Li et al. .................... 382/250 |
| 6,417,867 B1 | * | 7/2002 | Hallberg .................... 345/660 |
| 2001/0006561 A1 | | 7/2001 | Skodras et al. ............ 382/250 |

FOREIGN PATENT DOCUMENTS

WO       WO 98/41929       *  9/1998

OTHER PUBLICATIONS

Tham et al., "High Scalable Wavelet-Based Video Codec for Very Low Bit-Rate Environment", IEEE, vol. 16, No. 1, Jan. 1998, pp. pp. 12-27.*

* cited by examiner

*Primary Examiner*—Anh Hong Do
(74) *Attorney, Agent, or Firm*—Michael T. Gabrik

(57) ABSTRACT

An efficient compressed-domain-based algorithm that works by combining the IDCT and pixel-domain averaging into a single compressed domain operation, where a part of the cost of even this simplified operation can be absorbed into the de-quantization process. The original image need not be decompressed fully, only to the point of extracting the transform coefficients. Compressed-domain scaling for all scales k/8 for $1 \leq k \leq 8$, including $3/8$, $5/8$, $3/4$, $7/8$, is provided. By chaining multiple operations, any scale factors of the form $k_1 k_2 \ldots k_j/8^j$ for integers $k_i$'s in the range [1,7] can be achieved.

16 Claims, 4 Drawing Sheets

IMAGE SCALING IN THE COMPRESSED DOMAIN

BACKGROUND OF THE INVENTION

1. Field of the Invention

The present invention relates to an efficient compressed domain algorithm to downscale by a factor of k/8 (for any integer k in the range $1 \leq k \leq 8$) a JPEG digital image or any image/video content that uses the Discrete Cosine Transform (DCT). By chaining multiple such operations, any scale factors of the form $k_1 k_2 \ldots k_l / 8^l$ for integers $k_i$'s in the range [1,7] can be achieved. The algorithm can be implemented in various apparatuses, methods, and programs of instructions, e.g., software.

2. Description of the Related Art

Traditionally, downscaling a compressed digital image has been done by decompressing the image fully followed by pixel-domain averaging. As such, this approach incurs entropy-decoding, de-zigzagging, de-quantizing, and Inverse DCT (IDCT) costs.

While downscaling in the compressed domain by factors of ½, ¼ and ⅛ has been previously proposed in U.S. Pat. No. 5,708,732, this patent does not teach downscaling by all factors of the form k/8 for $1 \leq k \leq 8$, including ⅜, ⅝, ¾, ⅞. Moreover, this prior patent does not teach the technique of downscaling by obtaining a k×k block X of pixels from an 8×8 matrix Y of DCT coefficients using the equation: $X=(k/8)D_k^T Y_k D_k$, as described in the subject application.

OBJECTS AND SUMMARY OF THE INVENTION

Object of the Invention

It is therefore an object of the present invention to overcome the problems and shortcomings mentioned above.

It is a further object of this invention to provide an algorithm that works more efficiently than the prior downscaling techniques by combining the IDCT and pixel-domain averaging into a single compressed domain operation, where a part of the cost of even this simplified operation can be absorbed into the de-quantization process.

SUMMARY OF THE INVENTION

According to one aspect of this invention, a method for downscaling an image to a given target size is provided. The method comprises extracting a plurality of N×N blocks of transform coefficients representing data of the image to be downscaled; and transforming each of the extracted N×N blocks of transform coefficients into a k×k matrix of pixel values from the downscaled image, wherein the transformation from an N×N block of transform coefficients Y into a k×k matrix of pixel values X is achieved as follows:

$X=(k/N)D_k^T Y_k D_k$, where $1 \leq k \leq 8$, $Y_k$ is the top-left k×k sub-matrix of Y, and $D_k^T$ is the transpose of $D_k$ which is defined by:

$D_k(i,j)=(2/k)^{1/2} \alpha_i \cos[(2j+1)i\pi/2k]$, with $\alpha_i=1/\sqrt{2}$ for i=0 and 1 otherwise.

In the method, preferably N is 8, and the transform coefficients are discrete cosine transform coefficients.

The method preferably further comprises inverse quantizing the plurality of N×N blocks of transform coefficients representing data of the image to be downscaled, before the transforming step is performed; wherein the multiplier $(2/k)^{1/2}$ is absorbed into the inverse quantizing step.

In another aspect, the invention involves an apparatus for downscaling an image to a given target size. The apparatus comprises means for extracting a plurality of N×N blocks of transform coefficients representing data of the image to be downscaled; and means for transforming each of the extracted N×N blocks of transform coefficients into a k×k matrix of pixel values from the downscaled image, wherein the transformation from an N×N block of transform coefficients Y into a k×k matrix of pixel values X is achieved as follows:

$X=(k/N)D_k^T Y_k D_k$, where $1 \leq k \leq 8$, $Y_k$ is the top-left k×k sub-matrix of Y, and $D_k^T$ is the transpose of $D_k$ which is defined by:

$D_k(i,j)=(2/k)^{1/2} \alpha_i \cos[(2j+1)i\pi/2k]$, with $\alpha_i=1/\sqrt{2}$ for i=0 and 1 otherwise.

In the operations performed by the apparatus N is preferably 8, and the transform coefficients are discrete cosine transform coefficients.

Preferably, the apparatus further comprises means for inverse quantizing the plurality of N×N blocks of transform coefficients representing data of the image to be downscaled, before the transforming function is performed; wherein the multiplier $(2/k)^{1/2}$ is absorbed into the inverse quantizing operation.

The apparatus may be any of a variety of image processing devices including a computer, a cell phone, a personal digital assistant, a digital camera, etc.

In accordance with further aspects of the invention, the above-described method or any of the steps thereof may be embodied in a program of instructions (e.g., software) which may be stored on, or conveyed to, a computer or other processor-controlled device for execution. Alternatively, the method or any of the steps thereof may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Overview

The algorithm is designed to operate on a compressed image to provide a compressed or frequency domain downscaling solution. The term "image" includes pictorial representations, graphics, or combination thereof. The algorithm works by transforming an 8×8 matrix of DCT coefficients into a k×k matrix of pixel values from the downscaled image. These pixel values can be directly displayed.

The details of algorithm are described below in connection with a JPEG image, as that is the preferred embodiment. However, the algorithm is not limited to JPEG images. With some suitable alterations, which would be apparent to one skilled in the art in light of this disclosure, the algorithm may be applied to any image compression format using an orthogonal transform function.

Figure 1:
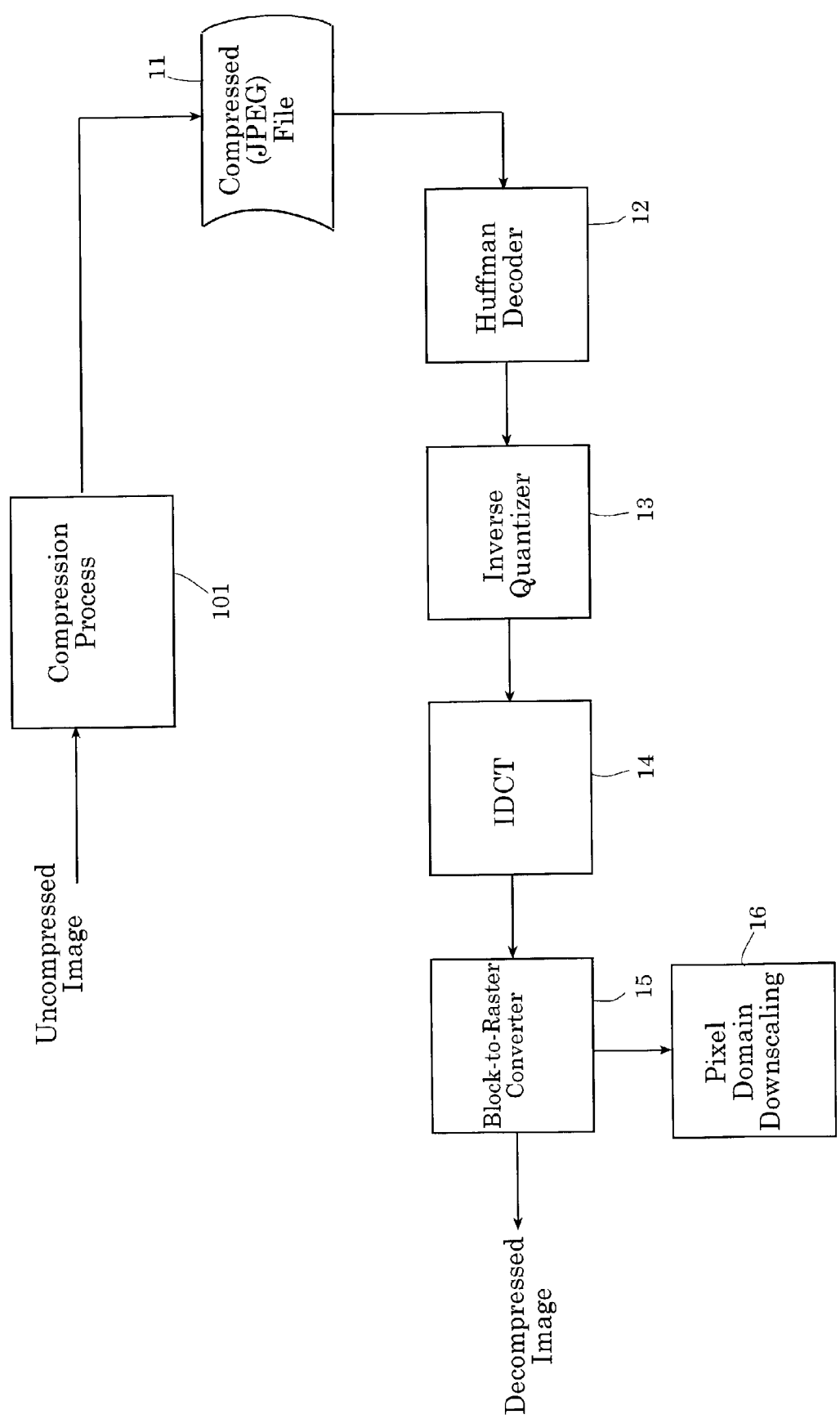
FIG. 1 is a block diagram illustrating the JPEG decompression process.

FIG. 1 shows the typical JPEG decompression process. In decompression, a compressed image, obtained through the JPEG compression process 101 and stored as a JPEG file, is reconstructed from the compressed bit-stream. The JPEG decompression process begins by decoding the compressed bit-stream 11 in a Huffman decoder 12, which has access to a Huffman table, to regenerate the 8×8 blocks of quantized DCT coefficients. The coefficients are reordered using an inverse zig-zagging procedure and the blocks are then fed through an inverse quantizer 13. In the next step, the 8×8 inverse discrete cosine transform (IDCT) 14 operates on the 8×8 blocks of DCT coefficients to generate a stream of 8×8 blocks of pixels. A block-to-raster converter 15 converts these blocks into a decompressed image. The IDCT can convert the DCT coefficients back to the pixels exactly. However, because the decompression process will actually work with the quantized coefficients only an approximation will be obtained.

With the present invention, instead of having to apply an IDCT operation followed by block-to-raster conversion 15 and pixel-domain downscaling 16, a combined operation is used that directly generates pixel values of the downscaled image. That is, the output of the IDCT 14 is processed in accordance with the invention to directly generate the pixel values of the downscaled image. If a JPEG image is desired as output (for example, if a chain of downscaling operations is to be applied), then the resulting pixels can be transformed using the DCT after grouping the data into 8×8 blocks.

B. Algorithm

Figure 2:
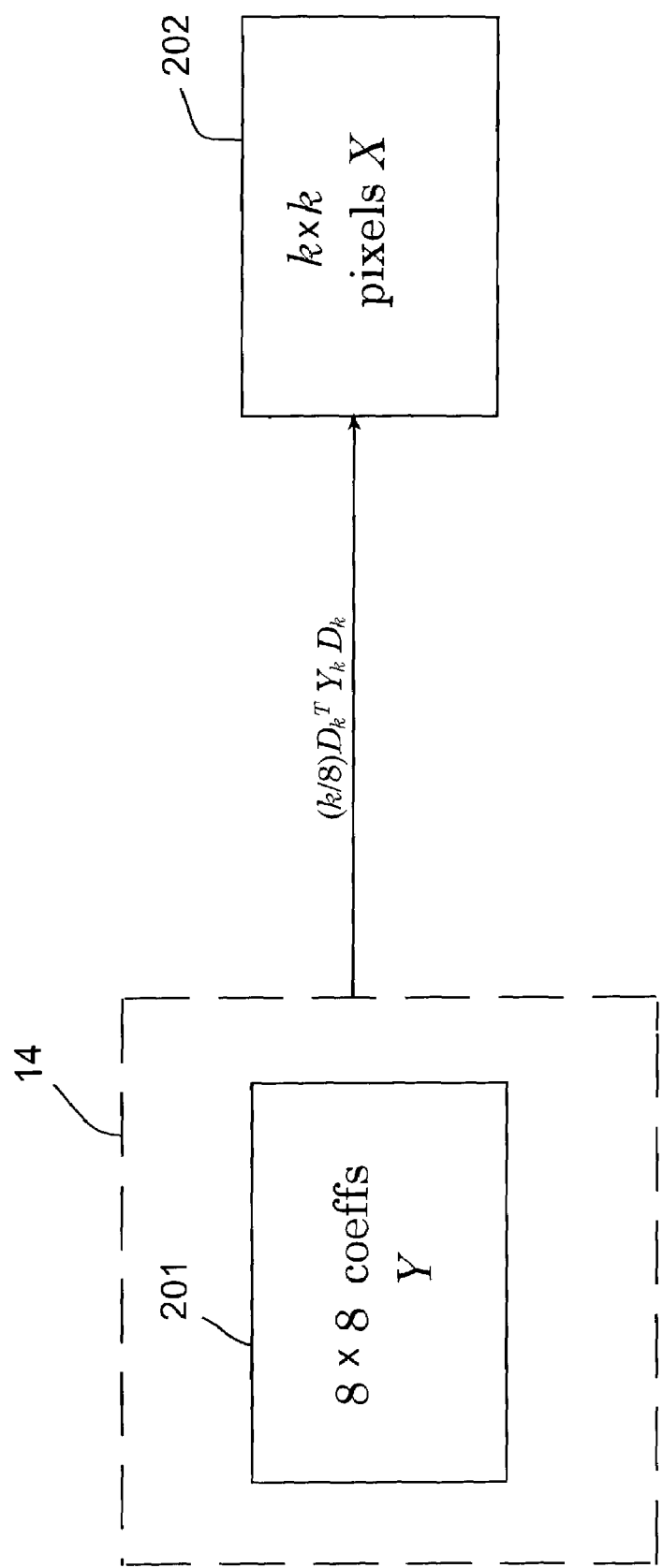
FIG. 2 is a block diagram illustrating a downscaling algorithm in accordance with embodiments of the present invention.

Referring to FIG. 2, an 8×8 matrix Y of DCT coefficients, which is the output from the IDCT, is identified by the reference numeral 201. In accordance with the invention, the transformation of Y into a k×k block X of pixel values, identified by the reference numeral 202, is obtained as $X=(k/8)D_k^T Y_k D_k$, where $Y_k$ is the top-left k×k sub-matrix of Y, $D_k^T$ is the transpose of $D_k$ which is defined by:

$D_k(i,j)=(2/k)^{1/2}\alpha_i \cos[(2j+1)i\pi/2k]$, with $\alpha_i=1/\sqrt{2}$ for i=0 and 1 otherwise.

For added efficiency, the multiplier $(2/k)^{1/2}$ is absorbed into the inverse quantization of DCT coefficients that precedes this transformation.

Figure 3:
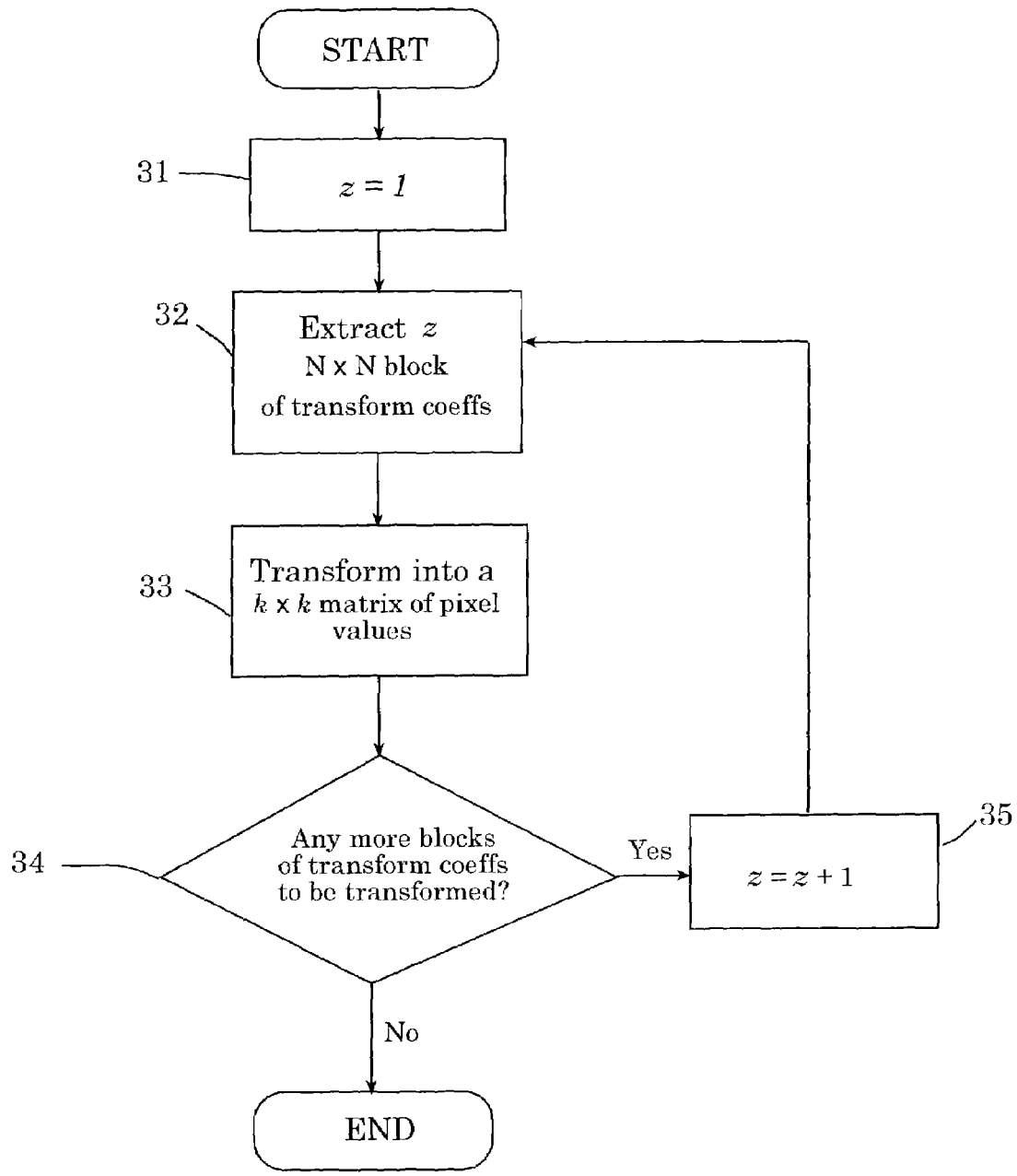
FIG. 3 is a flow chart illustrating the downscaling algorithm in accordance with embodiments of the invention.

FIG. 3 is a flow chart illustrating the inventive algorithm in accordance with embodiments of the invention. The algorithm begins at step 31 in which a block counting variable z is initialized to 1. The z N×N block of transform (e.g., DCT) coefficients is extracted in step 32 and then transformed into a k×k matrix of pixel values in step 33 using the transformation formula identified above. The transformation is repeated for each of the N×N block of transform coefficients. Thus, in step 34 it is determined if there are any more such blocks of transform coefficients to be transformed. If so, z is incremented in step 35, and the process returns to step 32 in which another block of transform coefficients is extracted. After all of the blocks have been processed (the decision in step 34 is "no") the algorithm ends.

C. Implementations

Figure 4:
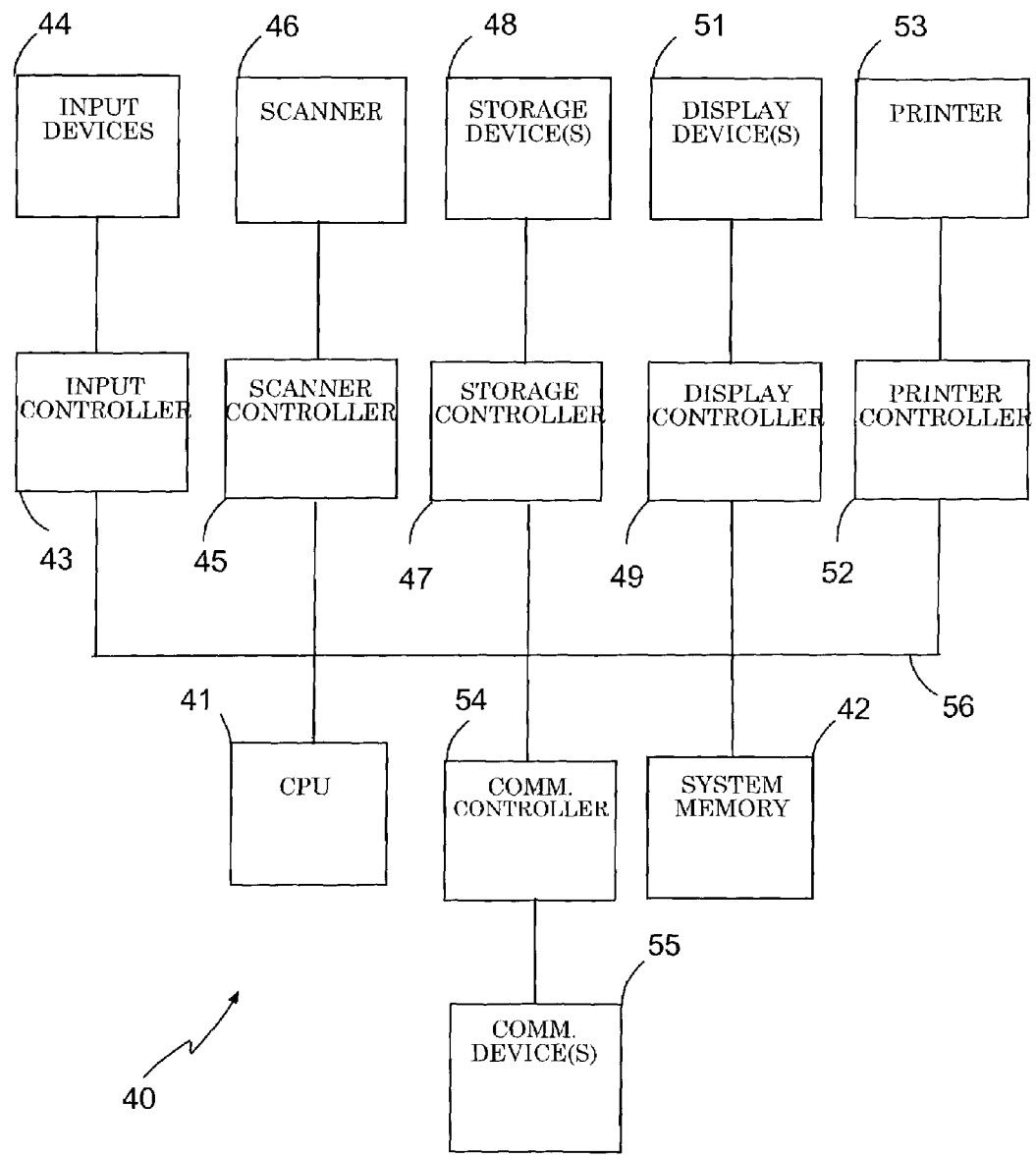
FIG. 4 is a block diagram of a system on which the algorithm of the present invention may be implemented.

The algorithm of the present invention may be conveniently implemented in software which may be run on an image processing system 40 of the type illustrated in FIG. 4. As illustrated in FIG. 4, the system includes a central processing unit (CPU) 41 that provides computing resources and controls the computer. CPU 41 may be implemented with a microprocessor or the like, and may also include a graphics processor and/or a floating point coprocessor for mathematical computations. System 40 further includes system memory 42 which may be in the form of random-access memory (RAM) and read-only memory (ROM).

A number of controllers and peripheral devices are also provided, as shown in FIG. 4. Input controller 43 represents an interface to one or more input devices 44, such as a keyboard, mouse or stylus. There is also a controller 45 which communicates with a scanner 46 or equivalent device for digitizing documents including images to be processed in accordance with the invention. A storage controller 47 interfaces with one or more storage devices 48 each of which includes a storage medium such as magnetic tape or disk, or an optical medium that may be used to record programs of instructions for operating systems, utilities and applications which may include programs that implement various aspects of the present invention. Storage device(s) 48 may also be used to store data to be processed in accordance with the invention. A display controller 49 provides an interface to a display device 51 which may be a cathode ray tube (CRT), thin film transistor (TFT) display, or LCD. A printer controller 52 is also provided for communicating with a printer 53 for printing documents including images processed in accordance with the invention. A communications controller 54 interfaces with a communication device 55 which enables system 40 to connect to remote devices through any of a variety of networks including the Internet, a local area network (LAN), a wide area network (WAN), or wirelessly through any suitable electromagnetic carrier signals including infrared signals.

In the illustrated system, all major system components connect to bus 56 which may represent more than one physical bus.

Depending on the particular application of the invention, various system components may or may not be in physical proximity to one another. For example, the input data (e.g., the input image to which the inventive algorithm is to be applied) and/or the output data (e.g., the output image to which the inventive algorithm has been applied) may be remotely transmitted from one physical location to another. Also, a program that implement various aspects of this invention may be accessed from a remote location (e.g., a server) over a network. Such data and/or program may be conveyed through any of a variety of machine-readable medium including magnetic tape or disk or optical disc, network signals, or any other suitable electromagnetic carrier signals including infrared signals. As used in the claims, the term "machine-readable medium" is intended to cover all such physical devices as well as electromagnetic carrier signals.

As will be apparent to those skilled in the art, not all of the components illustrated in FIG. 4 are necessary to practice the invention. Thus, depending on the particular environment in which the invention is practiced, not all of the components described in the system of FIG. 4 may be present. For example, the algorithm of the invention may be embodied in a cell phone, personal digital assistant, digital camera, or other small electronic device capable of storing and rendering images.

While the present invention may be conveniently implemented with software, a hardware implementation or combined hardware/software implementation is also possible. A hardware implementation may be realized, for example, using ASIC(s), digital signal processing circuitry, or the like. As such, the claim language "program of instructions" includes, in addition to software, instructions hardwired on a hardware component. Also, the "means" language used in the claims covers appropriately configured processing devices, such as CPUs, ASICs, digital processing circuitry, or the like. With these implementation alternatives in mind, it is to be understood that the figures and accompanying description provide the functional information one skilled in the art would require to write program code (i.e., software) or to fabricate circuits (i.e., hardware) to perform the processing required.

D. Effects

As the foregoing description demonstrates, the present invention provides an efficient and effective algorithm for downscaling a compressed image in the compressed domain. The original image need not be decompressed fully, only to the point of extracting the transform coefficients. Compressed-domain scaling for all scales k/8 for $1 \leq k \leq 8$, including 3/8, 5/8, 3/4, 7/8, is provided. By changing multiple such operations, any scale factors of the form $k_1 k_2 \ldots k_l/8^l$ for integers $k_i$'s in the range [1,7] can be achieved.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for downscaling an image to a given target size, comprising the steps of:
    extracting a plurality of N×N blocks of transform coefficients representing data of the image to be downscaled; and
    transforming each of the extracted N×N blocks of transform coefficients into a k×k matrix of pixel values from the downscaled image, wherein the transformation from an N×N block of transform coefficients Y into a k×k matrix of pixel values X is achieved as follows:
    $X = (k/N) D_k^T Y_k D_k$, where $1 \leq k \leq 8$, $Y_k$ is the top-left k×k sub-matrix of Y, and $D_k^T$ is the transpose of $D_k$ which is defined by:
    $D_k(i,j) = (2/k)^{1/2} \alpha_i \cos[(2j+1)i\pi/2k]$, with $\alpha_i = 1/\sqrt{2}$ for $i=0$ and 1 otherwise.

2. The method of claim 1, wherein N is 8.

3. The method of claim 1, wherein the transform coefficients are discrete cosine transform coefficients.

4. The method of claim 1, further comprising:
    inverse quantizing the plurality of N×N blocks of transform coefficients representing data of the image to be downscaled, before the transforming step is performed; wherein the multiplier $(2/k)^{1/2}$ is absorbed into the inverse quantizing step.

5. An apparatus for downscaling an image to a given target size, the apparatus comprising:
    means for extracting a plurality of N×N blocks of transform coefficients representing data of the image to be downscaled; and
    means for transforming each of the extracted N×N blocks of transform coefficients into a k×k matrix of pixel values from the downscaled image, wherein the transformation from an N×N block of transform coefficients Y into a k×k matrix of pixel values X is achieved as follows:
    $X = (k/N) D_k^T Y_k D_k$, where $1 \leq k \leq 8$, $Y_k$ is the top-left k×k sub-matrix of Y, and $D_k^T$ is the transpose of $D_k$ which is defined by:
    $D_k(i,j) = (2/k)^{1/2} \alpha_i \cos[(2j+1)i\pi/2k]$, with $\alpha_i = 1/\sqrt{2}$ for $i=0$ and 1 otherwise.

6. The apparatus of claim 5, wherein N is 8.

7. The apparatus of claim 5, wherein the transform coefficients are discrete cosine transform coefficients.

8. The apparatus of claim 5, further comprising:
    means for inverse quantizing the plurality of N×N blocks of transform coefficients representing data of the image to be downscaled, before the transforming function is performed; wherein the multiplier $(2/k)^{1/2}$ is absorbed into the inverse quantizing operation.

9. The apparatus of claim 5, wherein the apparatus comprises a computer.

10. The apparatus of claim 5, wherein the apparatus comprises a cell phone.

11. The apparatus of claim 5, wherein the apparatus comprises a personal digital assistant.

12. The apparatus of claim 5, wherein the apparatus comprises a digital camera.

13. A machine-readable medium having a program of instructions for directing a machine to downscale an image to a given target size, the program of instructions comprising:
    instructions for extracting a plurality of N×N blocks of transform coefficients representing data of the image to be downscaled; and
    instructions for transforming each of the extracted N×N blocks of transform coefficients into a k×k matrix of pixel values from the downscaled image, wherein the transformation from an N×N block of transform coefficients Y into a k×k matrix of pixel values X is achieved as follows:
    $X = (k/N) D_k^T Y_k D_k$, where $1 \leq k \leq 8$, $Y_k$ is the top-left k×k sub-matrix of Y, and $D_k^T$ is the transpose of $D_k$ which is defined by:
    $D_k(i,j) = (2/k)^{1/2} \alpha_i \cos[(2j+1)i\pi/2k]$, with $\alpha_i = 1/\sqrt{2}$ for $i=0$ and 1 otherwise.

14. The machine-readable medium of claim 13, wherein N is 8.

15. The machine-readable medium of claim 13, wherein the transform coefficients are discrete cosine transform coefficients.

16. The machine-readable medium of claim 13, further comprising:
    instructions for inverse quantizing the plurality of N×N blocks of transform coefficients representing data of the image to be downscaled, the inverse quantizing instructions being executed before the transforming instructions are executed; wherein the multiplier $(2/k)^{1/2}$ is absorbed into the inverse quantizing operation.

* * * * *